Oct. 23, 1945.  V. VON K. SUNDT  2,387,418
CLUTCH ADJUSTMENT
Filed Dec. 18, 1942  2 Sheets-Sheet 2
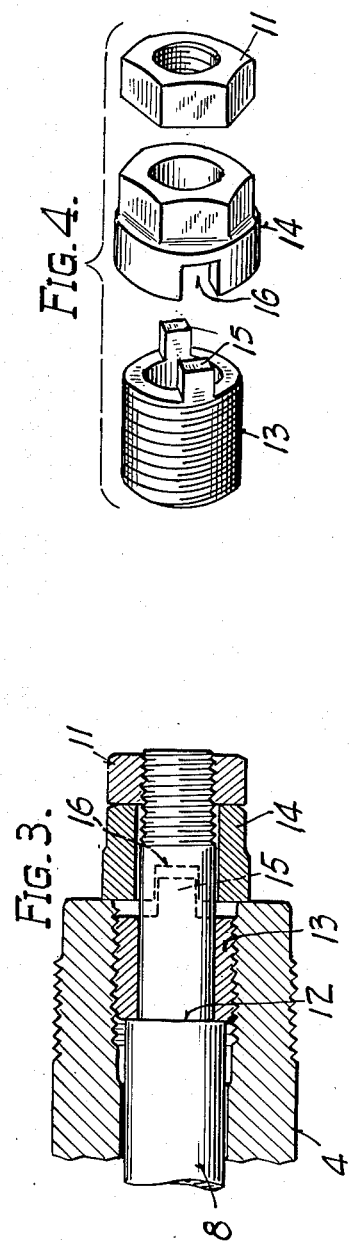
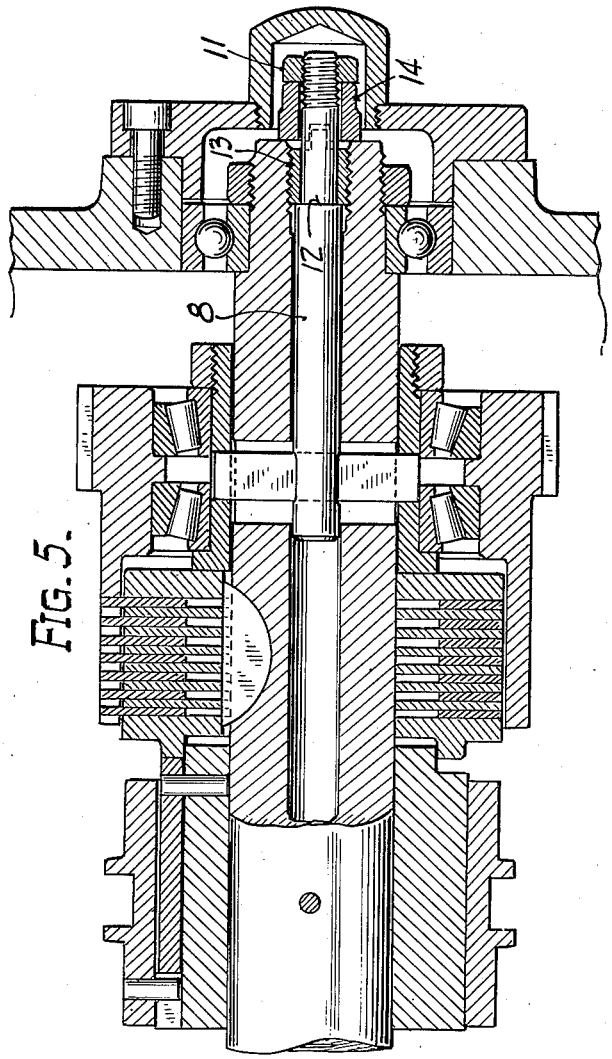
Vigo von Krogh Sundt
INVENTOR.
BY
ATTORNEY.

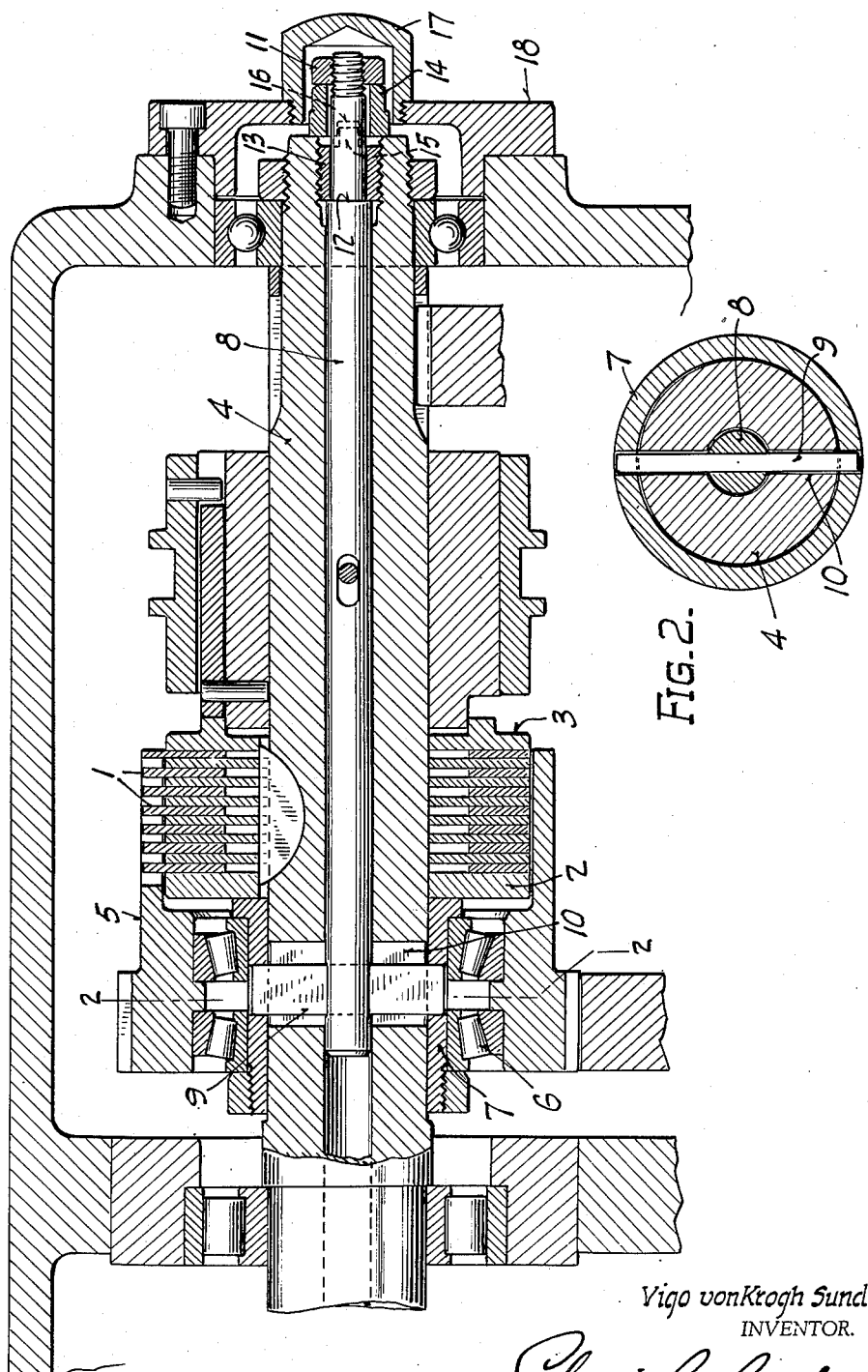

Patented Oct. 23, 1945

2,387,418

UNITED STATES PATENT OFFICE 2,387,418

CLUTCH ADJUSTMENT

Vigo von Krogh Sundt, Madison, Wis., assignor to Gisholt Machine Company, Madison, Wis., a corporation of Wisconsin Application December 18, 1942, Serial No. 469,497

4 Claims. (Cl. 192—110)

This invention relates to a clutch adjustment which has been applied to disc clutches employed in headstocks for machine tools as set forth in the copending application of the present inventor, Serial No. 469,496, filed on even date herewith.

The principal object of the invention is to enable the clutch to be adjusted readily from outside the ordinary housing and without requiring the removal of a hand hole cover or the like.

Another object is to provide a time saving, simple and inexpensive adjustment for disc clutches and the like.

In accordance with the invention, the floating member of the clutch is supported on a bearing on the clutch shaft and restrained from longitudinal movement from pressure on the clutch by being keyed to a rod extending axially in the shaft, and the longitudinal position of the rod is determined by threaded means at the outer end of the shaft and rod providing an adjustable abutment against which a shoulder on the rod is held.

The accompanying drawings illustrate the invention and the views in the drawings are as follows:

Figure 1 is a longitudinal section through a disc clutch and adjustment mechanism embodying the invention;

Fig. 2 is an enlarged vertical transverse section taken on line 2—2 of Fig. 1 and showing the key between the clutch bearing and the adjustment rod;

Fig. 3 is an enlarged detail section showing the arrangement of the adjustment nuts at the end of the shaft;

Fig. 4 is a perspective view of the separate nuts ready to be applied to the end of the adjusting rod; and Fig. 5 is a longitudinal sectional view similar to Fig. 1 and showing the adjustment for a modified type of clutch.

The clutch may be of any suitable construction, and ordinarily comprises a plurality of discs 1 disposed between an abutment plate 2 and a pressure plate 3. Alternate discs are keyed to a hollow shaft 4 and to the floating member 5 of the clutch.

The member 5 is mounted for free rotation on a bearing 6 supported on a movable sleeve 7 on shaft 4. The sleeve 7 serves to support abutment plate 2 against longitudinal movement during operation of the clutch and serves to move the abutment plate in adjusting the clutch for tightness.

The position of sleeve 7 and likewise of abutment plate 2 longitudinally of shaft 4 is determined by the position of the adjusting rod 8 axially of the shaft. A transverse key 9 secures sleeve 7 to rod 8 and is disposed in a wide slot 10 in shaft 4 to allow for movement of the key longitudinally of the shaft.

The rod 8 extends to the outer end of shaft 4 where it protrudes and is reduced in diameter and threaded to receive the nut 11. The shoulder 12 on the rod engages the inner end of a bushing 13 threaded into the end of shaft 4. A lock nut 14 extends between nut 11 and the end of shaft 4, and has a tongue and groove interlocked with bushing 13 to effect rotation thereof when nut 14 is rotated. The nut 14 is not threaded to anything.

The bushing 13, which serves as the adjusting nut determining the position of rod 8 axially of shaft 4, has two diametrically opposed longitudinally extending tongues 15 on its outer end which fit loosely in two corresponding recesses 16 in the inner end of nut 14.

An end cap 17 may be threaded into the housing 18 to cover the adjusting mechanism and prevent injury thereto.

When it is desired to adjust the clutch, the end cap 17 is removed. Nut 11 is loosened, thereby freeing nut 14 for rotation and the latter is rotated to effect threading of bushing 13 either into or out of the end of shaft 4.

Threading of bushing 13 into the shaft pushes rod 8 inwardly and thereby moves sleeve 7 to the left allowing abutment plate 2 to move to the left and loosen the clutch discs 1.

Threading of bushing 13 out of the shaft releases it from shoulder 12, and when nut 11 is again tightened against nut 14 and the end of shaft 4, it pulls the rod 8 outwardly until shoulder 12 engages the inner end of bushing 13 in its new position. This pulls sleeve 7 and abutment plate 2 to the right and effects tightening of the clutch discs.

The lock nut 14 serves to transmit force between nut 11 and the end of the shaft 4 tending to lock the threads of bushing 13 and prevent accidental turning of the bushing against forces transmitted from the clutch. The securing of nut 14 between nut 11 and the end of shaft 4 also prevents nut 14 from turning and likewise through its interlock with bushing 13, the latter is prevented from turning.

In the construction illustrated in Fig. 1, the pressure on the clutch discs in operation effects a pull on rod 8 tending to tighten nut 11 and its lock nut 14 against the end of the shaft and to loosen the pressure between shoulder 12 and bushing 13.

In the construction illustrated in Fig. 5, the pressure on the clutch discs in operation effects a push on rod 8 tending to loosen nut 11 and its lock nut 14 from the end of the shaft and to tighten the shoulder 12 against bushing 13.

In utilizing the invention, it is unnecessary to provide a manhole cover in the housing 18 to enable the adjustment of the clutch, and a more uniform adjustment of the discs is obtained than is possible with the manhole type of adjustment. The rapidity and ease of adjusting a clutch in accordance with the present invention is of considerable advantage.

Various embodiments of the invention may be employed within the scope of the accompanying claims.

I claim:

1. In a clutch, a fixed abutment mounted for rotation with a shaft and for adjustment longitudinally thereof to tighten or loosen the clutch, a rod extending axially of the shaft from the location of said abutment to the end of the shaft, a transverse key between said abutment and rod and secured therein to effect positioning of the abutment in accordance with the axial position of said rod, said key passing through an opening in the shaft sufficiently large to provide for the required longitudinal movement of the key in adjusting the clutch, said rod having a shoulder near its end, a bushing threaded into the bore in the shaft and engaging said shoulder, and a nut on the end of said rod for holding said shoulder against the bushing to secure the rod in adjusted axial position in the shaft determined by the axial position of said bushing in the shaft.

2. In a clutch, a fixed abutment mounted for rotation with a shaft and for adjustment longitudinally thereof to tighten or loosen the clutch, a rod extending axially of the shaft from the location of said abutment to the end of the shaft, a transverse key between said abutment and rod and secured therein to effect positioning of the abutment in accordance with the axial position of said rod, said key passing through an opening in the shaft sufficiently large to provide for the required longitudinal movement of the key in adjusting the clutch, said rod having a shoulder near its end, a bushing threaded into the bore in the shaft and engaging said shoulder, and a nut threaded on the end of said rod and having means bearing against the end of the shaft to hold said rod in position with said shoulder bearing against said bushing and determining the axial position of the rod by the axial position of said bushing in said shaft.

3. In a clutch, a fixed abutment mounted for rotation with a shaft and for adjustment longitudinally thereof to tighten or loosen the clutch, a rod extending axially of the shaft from the location of said abutment to the end of the shaft, a transverse key between said abutment and rod and secured therein to effect positioning of the abutment in accordance with the axial position of said rod, said key passing through an opening in the shaft sufficiently large to provide for the required longitudinal movement of the key in adjusting the clutch, said rod having a shoulder near its end, a bushing threaded into the bore in the shaft and engaging said shoulder, a nut threaded on the end of said rod, and a lock nut extending between said threaded nut and the end of the shaft and serving to lock the threads of said bushing against turning of the latter relative to said shaft.

4. In a clutch, a fixed abutment mounted for rotation with a shaft and for adjustment longitudinally thereof to tighten or loosen the clutch, a rod extending axially of the shaft from the location of said abutment to the end of the shaft, a transverse key between said abutment and rod and secured therein to effect positioning of the abutment in accordance with the axial position of said rod, said key passing through an opening in the shaft sufficiently large to provide for the required longitudinal movement of the key in adjusting the clutch, said rod having a shoulder near its end, a bushing threaded into the bore in the shaft and engaging said shoulder, a nut threaded on the end of said rod, and a lock nut extending between said threaded nut and the end of the shaft and rotationally interlocked with said bushing.

VIGO von KROGH SUNDT.